May 2, 1961 W. F. EGBERT 2,982,089
AFTERBURNER NOZZLE
Filed June 24, 1955 3 Sheets-Sheet 1
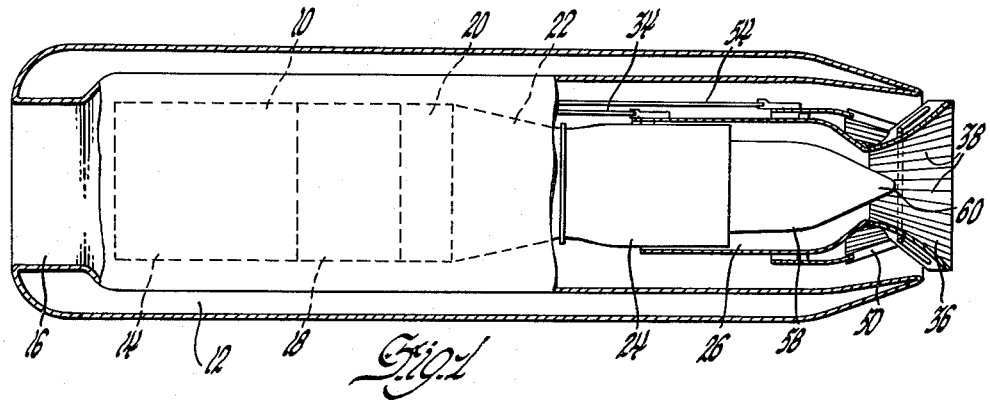
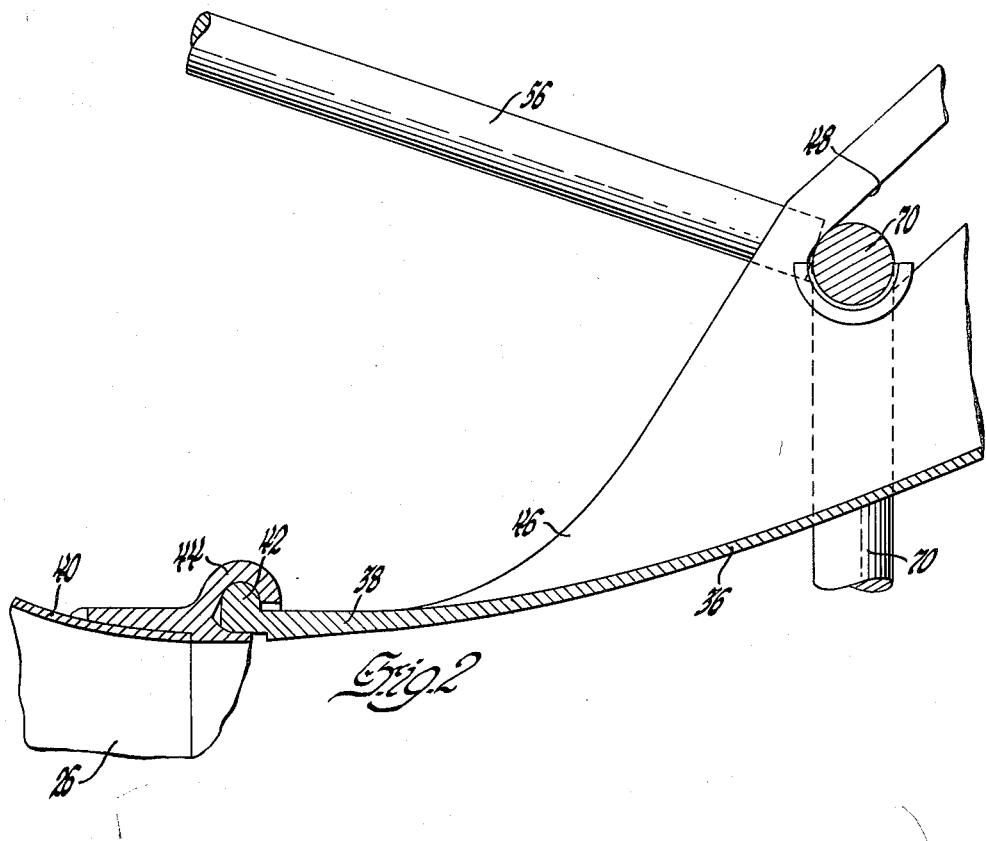
INVENTOR.
William F. Egbert
BY E. W. Christen
ATTORNEY

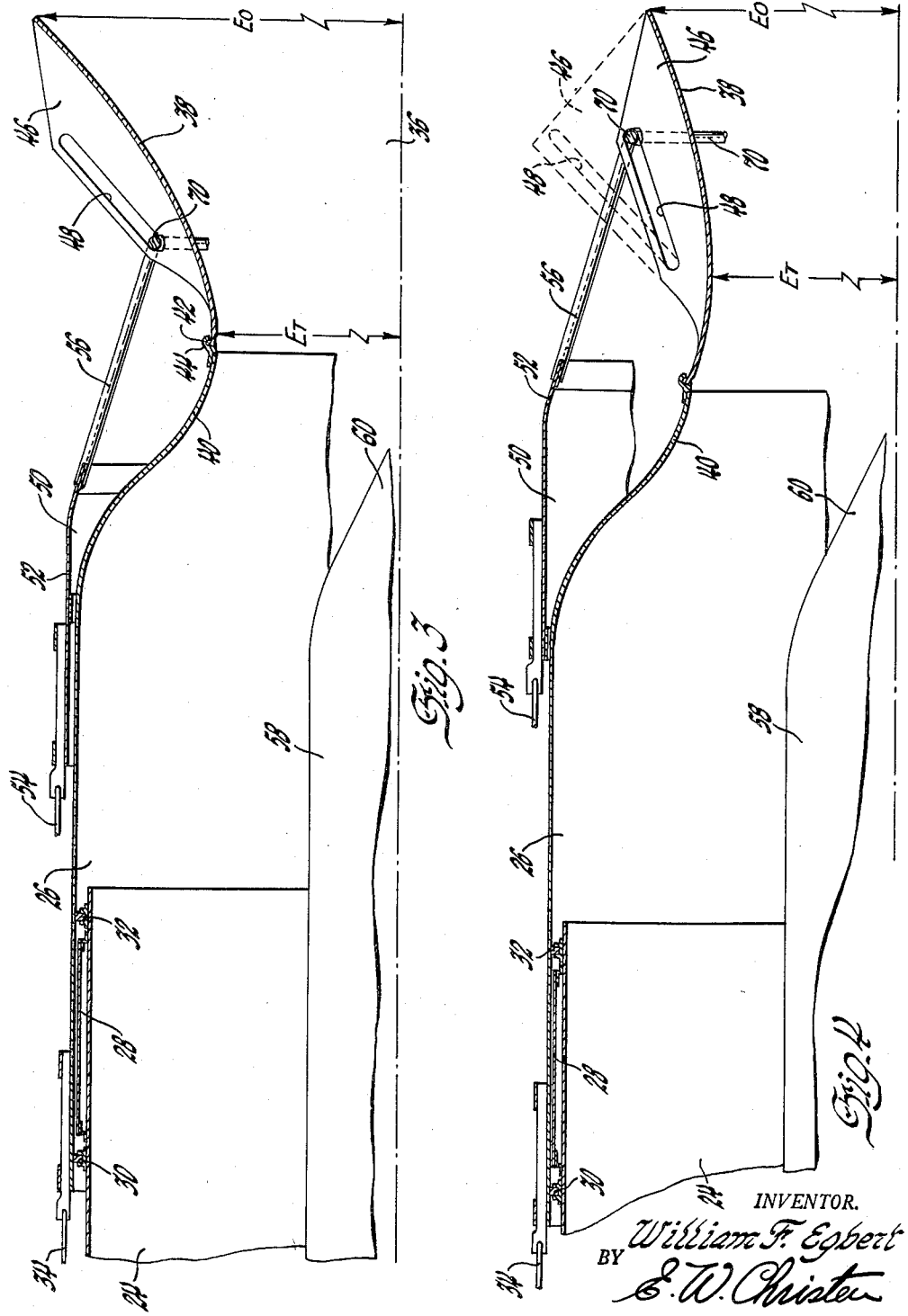

May 2, 1961 W. F. EGBERT 2,982,089
AFTERBURNER NOZZLE

Filed June 24, 1955 3 Sheets-Sheet 3

INVENTOR.
William F. Egbert
BY
ATTORNEY

United States Patent Office 2,982,089
Patented May 2, 1961

2,982,089

AFTERBURNER NOZZLE

William F. Egbert, Brownsburg, Ind., assignor to General Motors Corporation, Detroit, Mich., a corporation of Delaware Filed June 24, 1955, Ser. No. 517,779

6 Claims. (Cl. 60—35.6)

This invention relates to turbojet aircraft engines, and more particularly to exhaust nozzle arrangements therefor.

The invention is primarily concerned with high pressure ratio, afterburner-equipped, turbojet engines that are capable of propelling aircraft at supersonic speeds. The turbine exhaust gas of such an engine is at a relatively high temperature, high pressure and low velocity and is expanded to atmosphere through a suitable nozzle at a relatively high velocity, low temperature and low pressure to power the aircraft. The exhaust jet velocity at the nozzle outlet is a function of the turbine outlet temperature and of the expansion ratio through the nozzle. Maximum use of the available energy in the turbine exhaust gas of a high pressure ratio turbojet engine can be obtained by complete expansion of the exhaust gas to ambient pressure through a convergent-divergent nozzle. For best efficiency under various operating conditions it is desirable that the convergent-divergent nozzle be provided with means to vary its discharge or outlet area and with means to vary its throat area.

An object of the invention is to provide a nozzle arrangement that will have a wide range of area variation and that will meet the rigid strength and weight requirements of aircraft engine practice.

In physical form the invention embodies a plurality of cooperating means for varying the area of the nozzle and includes a plurality of overlapping arcuate nozzle flaps that are pivoted about the reduced end of an afterburner exhaust duct. The nozzle flaps are provided with generally radial cam slots and the hoop end of an actuating cage rides in the cam slots to impart opening and closing movement to the nozzle flaps on axial movement of the cage. A tailcone is located within the exhaust duct with its rearward end proximate the nozzle flaps and the afterburner exhaust duct is axially shiftable with respect to the tailcone to shift the nozzle flaps into and out of encircling relation with the tailcone. The throat and outlet areas of the nozzle are varied concurrently by radially opening and closing the nozzle flaps. Additional nozzle area variation is achieved by axially shifting the nozzle flaps into or out of encircling relation with the tailcone. The latter area variation can take place independently of the former so that the throat area can be varied without concurrent outlet area variation.

Further objects and advantages of the present invention will be apparent from the following description, reference being had to the accompanying drawings, wherein a preferred form of the present invention is clearly shown.

In the drawings:

Figure 1 is a side view of an aircraft turbojet installation, partially broken away;

Figure 2 is a partial longitudinal section of the exhaust portion of the engine substantially enlarged to illustrate a nozzle flap at its point of attachment;

Figure 3 is a partial longitudinal section of the exhaust portion of the engine illustrating the nozzle in open position and with the exhaust duct extended rearwardly to clear the nozzle throat of the tailcone;

Figure 4 is a partial section that corresponds to Figure 3 illustrating the nozzle in closed position.

Figure 5:
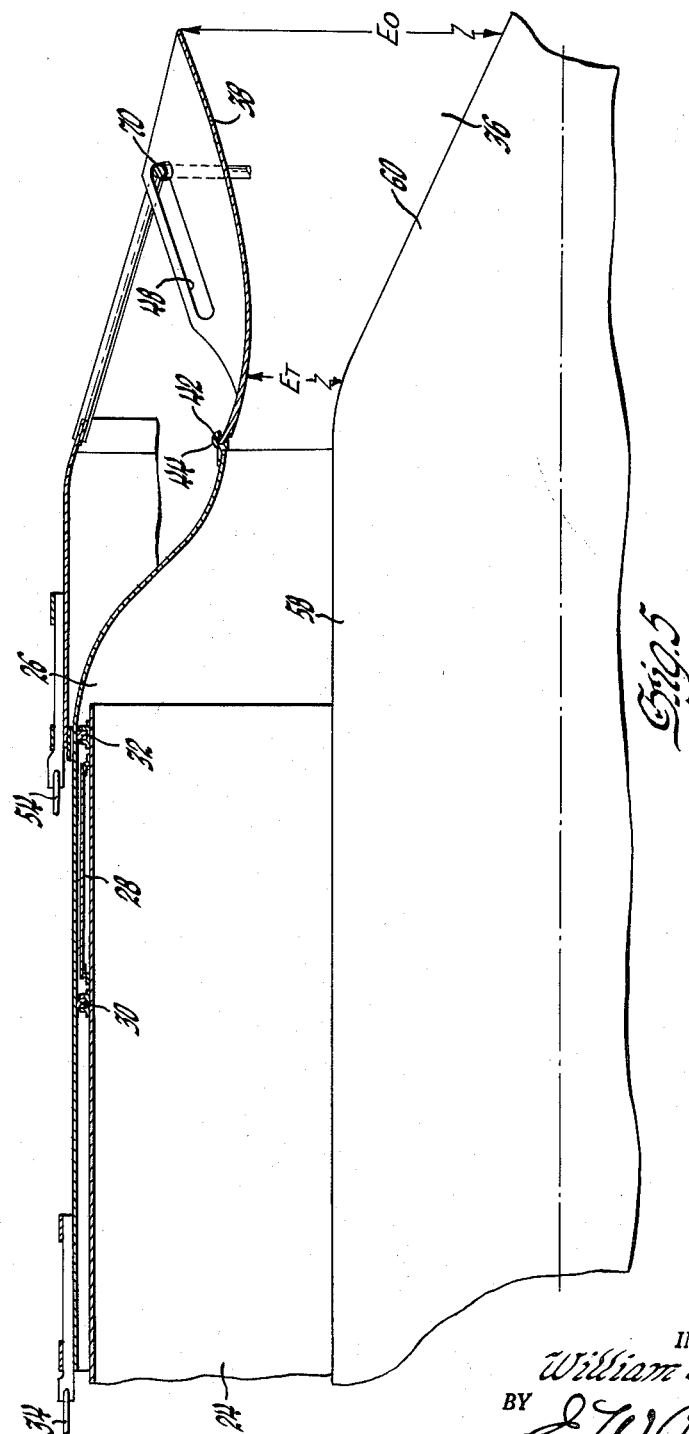
Figure 5 is a partial section that corresponds to Figure 4 but illustrating the exhaust duct retracted forwardly to encircle the tailcone and thus introduce the end portion of the tailcone into the throat of the nozzle.

Referring now to Figure 1, a substantially annular turbojet engine 10 of known design is supported in the annular interior of an aircraft nacelle 12. The turbojet engine includes a compressor 14 which receives air from the nacelle inlet 16 and delivers it to the combustor 18 for expansion through a turbine 20 that drives the compressor. The exhaust gas from the turbine passes through an annular diffuser casing 22 and an afterburner 24.

Referring to the remaining figures, an exhaust duct 26 is slidably supported for axial movement on the cylindrical casing 24 of the afterburner by longitudinally extending ribs 28. Split expansion rings 30 and 32 prevent the high pressure exhaust gas from escaping between the afterburner casing 24 and the exhaust pipe 26. A longitudinally movable actuating rod 34 is secured to the exhaust duct 26 to impart axial movement thereto.

The high velocity exhaust gas is emitted from the exhaust pipe 26 through a variable area jet nozzle 36 to drive the aircraft. The nozzle is fashioned from a plurality of overlapping flaps or staves 38 of generally T section, each pivotally secured to the reduced end 40 of the exhaust duct 26 by arcuate tongues 42 that lie in a corresponding annular groove 44 in the exhaust duct extremity. Each nozzle flap 38 has a radially extending side plate 46 secured thereto to form a cam slot 48 that extends at an acute angle to the longitudinal axis or center line of the engine. An actuator 50 includes a cylinder 52 supported for axial movement on the exhaust pipe 26 and under the control of an actuating rod 54. The actuator 50 carries a projecting cage-like structure that includes a plurality of longitudinal bars 56 and a hoop 70 that rides in the cam slots 48 to swing the nozzle flaps 38 inwardly and outwardly in a radial sense on axial shifting of the hoop to vary the flow condition in the nozzle. A fixed tailcone 58 is located in the exhaust pipe 26 with its conical end 60 proximate the nozzle flaps 38. The nozzle flaps 38 have substantially parabolic curvature and are pivoted at their more highly curved end to the reduced end 40 of the exhaust pipe to provide a variable area convergent-divergent nozzle.

By reference to Figures 3 and 4, it can be seen that the exhaust outlet radius $E_o$ and the exhaust throat radius $E_t$ are varied concurrently by axial movement of the actuator 50.

In installations where the engine temporarily operates at a low pressure ratio, the exhaust nozzle should have a converging range as well as a converging-diverging range. This is readily accomplished by increasing the slope of the cam slots 48 of the exhaust nozzle flaps 38, as shown by the dotted lines of Figure 4, so that the exhaust throat outlet $E_t$ continues to move rearwardly towards the exhaust outlet $E_o$ on rearward movement of the actuator 50 until the throat and outlet coincide to achieve a purely convergent nozzle.

By reference to Figure 5, it can be seen that the effective exhaust throat radius $E_t$ can be varied without affecting the exhaust outlet radius $E_o$ by axially shifting the exhaust pipe 26 and the associated nozzle flaps 38 with respect to the fixed tailcone 58 so as to introduce the pointed end of the tailcone into the center portion of the nozzle. The effective exhaust outlet radius $E_t$ can also be varied if sufficient axial shifting takes place to introduce the tailcone into the nozzle outlet. The nozzle flap actuating rod 54 and the exhaust pipe actuating rod 34 are preferably operated independently of each other but it should be realized that they could be operated concurrently in a coordinated manner, if desired.

Major design improvements to present day aircraft turbojet engines have resulted in greatly increased thrust ratings with but little diameter increases thereby maintaining the frontal area of the engines at a minimum and avoiding parasitic drag increases. The variable area exhaust nozzle of the invention is particularly adapted for high thrust, small diameter engines as the cooperating dual means for varying the exhaust nozzle area allows an efficient wide range of operability without increasing the diameter of the engines. The invention accomplishes this because a sizable percentage of area variation is obtained by the axial movement of the nozzle flaps with respect to the tailcone.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A turbojet engine comprising an exhaust duct having a reduced end, a tailcone in the exhaust duct having a tapered end proximate the reduced end of the exhaust duct, and an exhaust nozzle comprising a plurality of flaps, curved to provide inner surfaces convex in longitudinal cross section and pivotally secured to the reduced end of the exhaust duct for radial movement to provide throat and outlet portions of variable area, the exhaust duct and arcuate flaps being relatively shiftable in an axial direction with respect to the tailcone to provide an area variation of the throat portion of the exhaust nozzle in addition to that area variation provided by pivotal movement of the arcuate flaps.

2. Apparatus in accordance with claim 1 wherein the exhaust nozzle has a variable area convergent range of operation as well as a variable area convergent-divergent range of operation.

3. Apparatus in accordance with claim 1 including an axially shiftable hoop about said flaps and a cam connection between said hoop and flaps to swing said flaps radially on axial shifting of said hoop, a first actuator for axially shifting said hoop, and a second actuator for axially shifting said exhaust duct and said flaps.

4. Apparatus in accordance with claim 1 wherein said exhaust duct and flaps are axially shiftable independently of pivotal movement of said flaps whereby area variation of the nozzle throat can take place without area variation of the nozzle outlet.

5. Apparatus as claimed in claim 1 wherein the flaps are substantially parabolic, wherein the nozzle outlet is formed by the flat portion of the parabola, wherein the nozzle throat is formed by the curved portion of the parabola, and wherein the end of the tailcone is of conical configuration.

6. Apparatus in accordance with claim 5 including an axially shiftable hoop about said flaps and a cam connection between said hoop and flaps to swing said flaps radially on axial shifting of said hoop, said hoop being axially shiftable independently of relative axial movement between said exhaust duct and said tailcone.

References Cited in the file of this patent

UNITED STATES PATENTS

| 2,443,250 | Johnson | June 15, 1948 |
| 2,570,629 | Anxionnaz | Oct. 9, 1951 |
| 2,693,078 | Laucher | Nov. 2, 1954 |
| 2,778,190 | Bush | Jan. 22, 1957 |
| 2,806,349 | Yeager | Sept. 17, 1957 |

FOREIGN PATENTS

| 526,525 | Belgium | Mar. 15, 1954 |
| 750,307 | Great Britain (duplicate) | June 13, 1956 |